United States Patent [19]

Abraham et al.

[11] Patent Number: 5,858,573
[45] Date of Patent: Jan. 12, 1999

[54] CHEMICAL OVERCHARGE PROTECTION OF LITHIUM AND LITHIUM-ION SECONDARY BATTERIES

[75] Inventors: Kuzhikalail M. Abraham, Needham, Mass.; James F. Rohan, Cork City, Ireland; Conrad C. Foo, Dedham, Mass.; David M. Pasquariello, Pawtucket, R.I.

[73] Assignee: EIC Laboratories, Inc., Norwood, Mass.

[21] Appl. No.: 703,577

[22] Filed: Aug. 23, 1996

[51] Int. Cl.⁶ .................................................. H01M 10/40
[52] U.S. Cl. .......................... 429/198; 429/192; 29/623.1
[58] Field of Search .................................... 429/198, 192, 429/105; 29/623.1

[56] References Cited

U.S. PATENT DOCUMENTS

| | | | |
|---|---|---|---|
| 4,489,145 | 12/1984 | Abraham et al. | 429/197 |
| 4,943,499 | 7/1990 | Casalbore-Miceli et al. | 429/192 |
| 5,219,679 | 6/1993 | Abraham et al. | 429/192 |
| 5,252,413 | 10/1993 | Alamgir et al. | 429/192 |
| 5,260,145 | 11/1993 | Armand et al. | 429/192 X |
| 5,474,860 | 12/1995 | Abraham et al. | 429/192 |
| 5,556,524 | 9/1996 | Albers | 429/198 X |

OTHER PUBLICATIONS

Prema, S. and Srinivasan, M., "Preparation and Properties of Polyamides Containing Thianthrene Units," Eur. Polym. J., vol. 23, No. 11, pp. 897–903, 1987. (Month unknown).

*Primary Examiner*—Stephen Kalafut
*Attorney, Agent, or Firm*—Edward J. Kelly; Foley, Hoag & Eliot LLP

[57] ABSTRACT

This invention features the use of redox reagents, dissolved in non-aqueous electrolytes, to provide overcharge protection for cells having lithium metal or lithium-ion negative electrodes (anodes). In particular, the invention features the use of a class of compounds consisting of thianthrene and its derivatives as redox shuttle reagents to provide overcharge protection. Specific examples of this invention are thianthrene and 2,7-diacetyl thianthrene. One example of a rechargeable battery in which 2,7-diacetyl thianthrene is used has carbon negative electrode (anode) and spinet $LiMn_2O_4$ positive electrode (cathode).

21 Claims, 7 Drawing Sheets

CHEMICAL OVERCHARGE PROTECTION OF LITHIUM AND LITHIUM-ION SECONDARY BATTERIES

This invention was made with support from the Department of Energy under Contract DE-FC02-91CE50336 administered by the United States Advanced Battery Consortium. The consortium and the U.S. Government have certain rights in this invention.

FIELD OF INVENTION

This invention relates to electrochemical cells and more particularly to improved non-aqueous liquid and polymer electrolytes for cells incorporating alkali metal negative electrodes (anodes), and especially lithium anodes or lithium-ion anodes. The improvement features the use of a new class of compounds as redox reagents, dissolved in non-aqueous electrolytes, to provide overcharge protection.

BACKGROUND OF THE INVENTION

The electrolyte solution is a crucial component in an ambient temperature secondary lithium cell. A non-aqueous solvent or mixture of solvents which dissolves an appreciable amount of lithium salts to form highly conducting solutions is desirable. The electrolyte should afford high efficiency for cycling of the lithium or lithium-ion electrode, and exhibit good thermal stability up to 70° C. (the usual upper temperature limit for operation of ambient temperature batteries).

A highly desirable liquid electrolyte solution established for ambient temperature Li secondary cells is described in U.S. Pat. No. 4,489,145. It comprises a solution of $LiAsF_6$ dissolved in a mixed solvent of tetrahydrofuran (THF), 2-methyltetrahydrofuran (2-Me-THF), and 2-methylfuran (2-Me-F). Other aprotic electrolytes have contained cyclic carbonates such as propylene carbonate (PC) and ethylene carbonate (EC), and have been the subject of much study in terms of both basic electrochemistry and battery applications for many years.

More recent developments have included the use of electrolytes based on polymers such as polyacrylonitrile (PAN), poly(tetraethylene glycol diacrylate) (PEGDA), poly (vinyl) pyrrolidinone (PVP), poly (vinyl chloride) (PVC), or poly(vinyl sulfone) (PVS). In these electrolytes the polymers are matrices to immobilize complexes (solvates) formed between Li salts, such as $LiAsF_6$, $LiCF_3SO_3$, $LiPF_6$, $LiN(CF_3SO_2)_2$ and $LiBF_4$, and an aprotic organic solvent (or mixture of such solvents) to allow fabrication of free-standing electrolyte films to be used in solid-state Li and Li-ion batteries (K. M. Abraham et al., U.S. Pat. Nos. 5,219,679; 5,252,413; 5,457,860).

Unlike aqueous cells, non-aqueous electrolyte (organic electrolyte) cells may not be overcharged without causing irreversible electrolyte side-reactions which deteriorate cell performance. Cells are safeguarded during laboratory charge/discharge tests by careful control of the voltage limits by means of the electronic equipment used in the test. Electronic overcharge control comprises a sensing circuit which prevents current from flowing into the cell once it reaches the voltage corresponding to complete charge. The charge voltage limit is selected according to the electrochemical couple in the cell. For example, Carbon/$LiMn_2O_4$ cells have an upper charge limit of 4.3V vs. $Li^+$/Li.

Chemical overcharge protection of a battery consisting of cells connected in series is particularly important for two reasons. Firstly, it will replace electronic overcharge controllers in individual cells. Electronic controllers lower the energy density of the battery and increase battery cost. Secondly, it will provide capacity balance among the individual cells and prevent oxidative degradation of the electrolyte. The capacity balance among the cells in a battery may be lost, especially after repeated charge/discharge cycles. This means that the accessible capacity of individual cells may not remain equal. In this instance, the cathode of the cell with the lowest capacity will be pushed above the normal upper voltage limit. Oxidative degradation of the electrolyte will occur at these higher potentials, and this will degrade the cycle life of the battery at an accelerated rate. Even if the electrolyte does not decompose, the weaker cell will contribute a larger fraction of the total cutoff voltage for the battery causing the capacity of the cells in the battery to become increasingly out of balance at each additional cycle, since the stronger cells will not be charged to their full capacity. The result is a reduced cycle life for the battery as compared to its individual cells.

A redox shuttle offers the best approach to cell overcharge protection. In this scheme, a material with an appropriate oxidation potential is dissolved in the electrolyte where it remains unreactive until the cell is charged fully. At a potential slightly above the cell charge limit (upper cutoff voltage), the redox shuttle is activated by its electrochemical conversion. The cell potential during overcharge is fixed at the oxidation potential of the redox shuttle. This process is supported by diffusion of the oxidized products to the anode where they recombine to form the starting material. Once the reformed material diffuses back to the cathode, it is oxidized and the cathode potential is maintained indefinitely at the oxidation potential of the redox reagent, until the time that charging is terminated.

Necessary properties of a redox shuttle include: high solubility in the electrolyte; an oxidation potential slightly higher than the normal charge limit of the cell but lower than the oxidation potential of the electrolyte; the ability of the oxidized form to be reduced at the anode without side reactions; and chemical stability in the cell of both the oxidized and reduced forms of the shuttle reagent.

Accordingly, an object of this invention is the use of redox reagents to provide a means of chemical overcharge protection to secondary non-aqueous liquid and polymer electrolyte cells with lithium or lithium-ion anodes.

SUMMARY OF THE INVENTION

The invention features a rechargeable electrochemical cell which includes an anode, a cathode, and an electrolyte. The electrolyte is a non-aqueous solvent or a mixture of non-aqueous solvents which may or may not be immobilized in a polymer matrix, and in which one or more salts and the redox reagent are dissolved. The redox reagent is ideally present in an amount sufficient to maintain proper mass transport for the desired steady overcharge current for the cell.

DETAILED DESCRIPTION OF THE INVENTION

In a preferred embodiment of the invention, thianthrenes (R) are used for the protection of lithium and lithium-ion secondary cells from the effects of overcharge. Their activity is manifested through the redox shuttle reactions depicted in Scheme I.

Scheme I: Redox Shuttle

At the cathode: R ⟶ R$^+$ + e$^-$;  $^ER > ^E$cathode   [1]

At the anode: R$^+$e$^-$ ⟶ R   [2]

Figure 1:
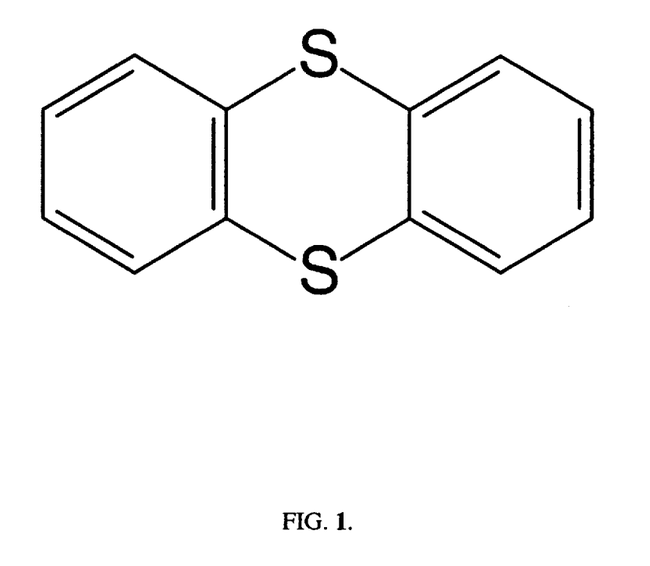
FIG. 1 shows the structure of thianthrene.
Figure 2:
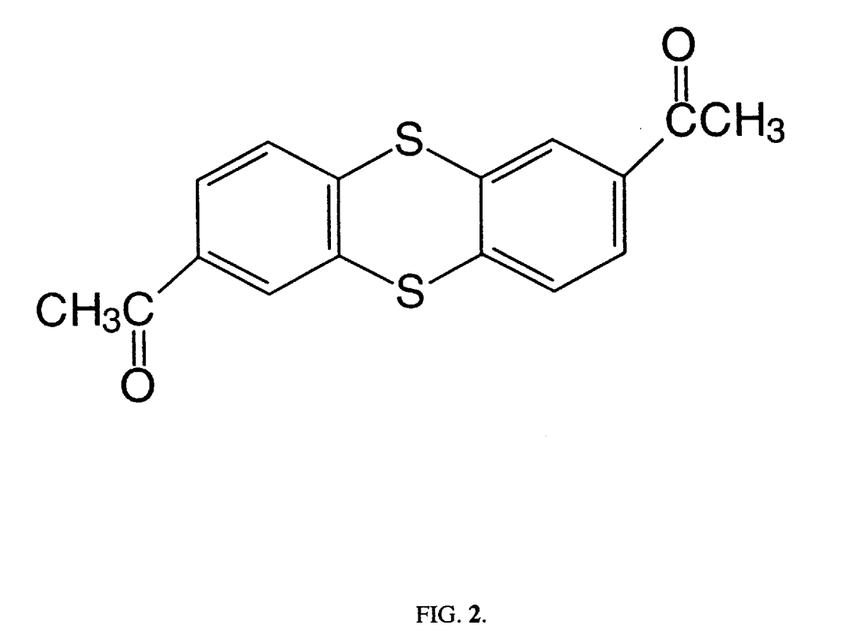
FIG. 2 shows the structure of 2,7-diacetyl thianthrene.

According to this scheme, R represents thianthrene (FIG. 1), or one of its derivatives such as 2,7-diacetyl thianthrene (FIG. 2). R is added to the electrolyte where it is available for a reversible oxidation-reduction (redox) shuttle reaction. The electrolyte may be a liquid solution with a single solvent, such as propylene carbonate-1.0M LiPF$_6$, or a mixed-solvent solution such as 50% ethylene carbonate:50% propylene carbonate-1.0M LiPF$_6$. Other embodiments of this invention may have the liquid electrolyte immobilized into a polymer such as poly(acrylonitrile) (PAN), poly(tetraethylene glycol diacrylate) (PEGDA), polyvinyl pyrrolidinone (PVP), poly(vinyl chloride), poly(vinyl sulfone), poly(ethylene oxide) or poly(vinylidene fluoride) (PVdF) as described in the aforementioned U.S. Patents pertaining to polymer electrolytes.

The protective redox shuttle reaction is initiated when the cathode reaches the oxidation potential of the redox reagent as in [1]. It proceeds with the diffusion of the oxidized species (R$^+$) to the anode where it is reformed as in [2]. The reaction is sustained by diffusion of the reformed reagent back to the cathode. Judicious selection of the particular thianthrene will allow the overcharge protection agent to be tailored to the appropriate cell voltage.

Figure 3:
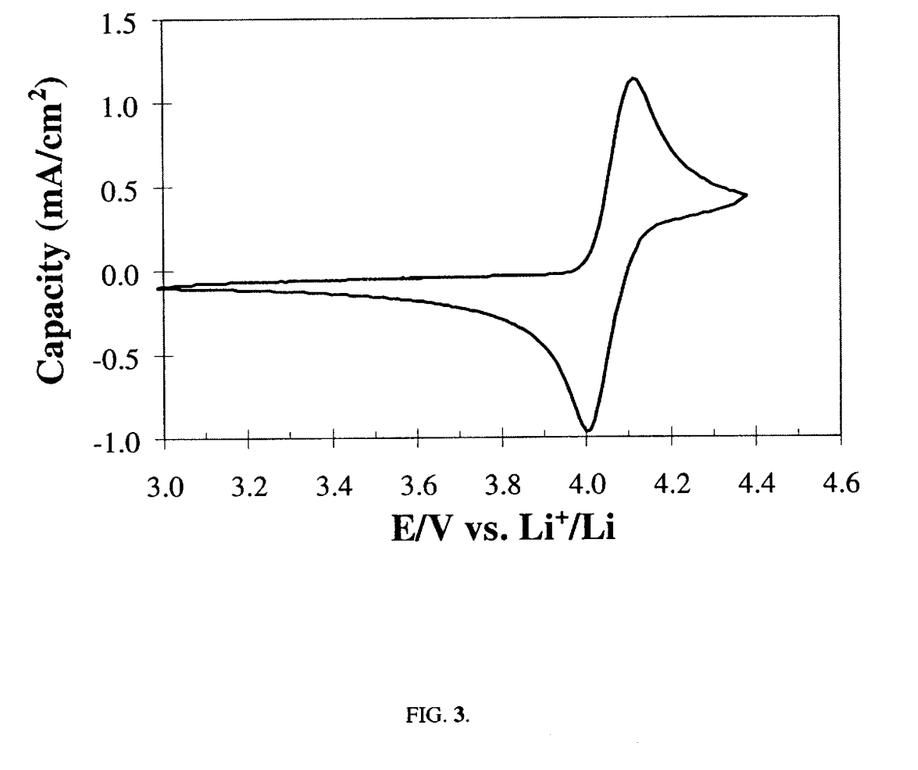
FIG. 3 shows the cyclic voltammogram obtained with a Li//organic electrolyte//glassy carbon cell in which the electrolyte was 50% EC:50% PC-1.0M $LiPF_6$ with 10 mM thianthrene. The scan rate was 100 mV/s.

The redox potential of prospective shuttle candidates is determined readily from cyclic voltammetry of glassy carbon microelectrodes in electrolyte containing the compound of interest. For example, a solution of 10 mM thianthrene, in 50% EC:50% PC-1.0M LiPF$_6$, was tested at a scan rate of 100 mV/s. FIG. 3 shows a symmetrical wave which is characteristic of a reversible reaction with the peak oxidation current at 4.12V and the corresponding reduction (regeneration of the starting material) at 4.06V vs. Li$^+$/Li.

Figure 4:
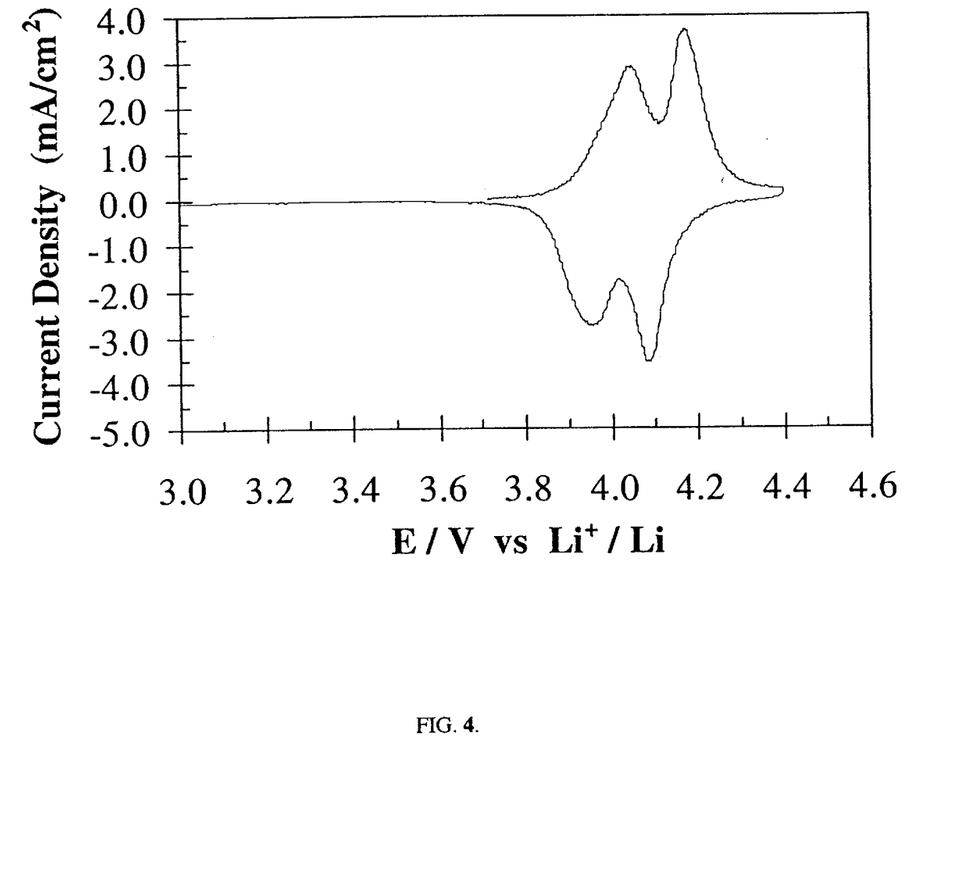
FIG. 4 shows the reversible extraction and insertion of lithium for $LiMn_2O_4$. Data were collected using a cell with the configuration Li//PAN-EC-PC-LiPF$_6$//LiMn$_2$O$_4$ and the scan rate was 20 μV/s.

The redox potential of the insertion cathode determines the suitability of the protective agent. FIG. 4 shows that Li is removed from LiMn$_2$O$_4$ in two stages, with peaks centered at 4.05V and at 4.17V vs.. Li$^+$/Li. Consequently, although thianthrene exhibits the desired redox behavior, it is not suitable for use in the C/LiMn$_2$O$_4$ cell since the activation of the redox shuttle would overlap with the removal of lithium from the cathode. This would interfere with the cathode utilization so that the cell would not charge fully.

Figure 5:
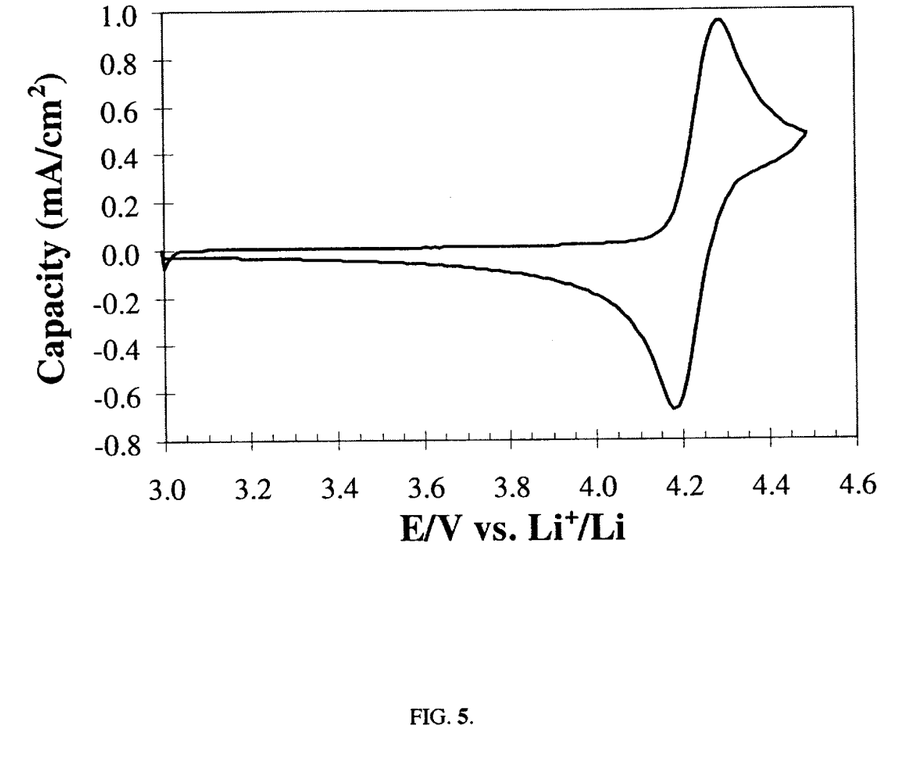
FIG. 5 shows the shift in the redox potential obtained by acetylating thianthrene to form 2,7-diacetyl thianthrene. The electrolyte was 50% EC:50% PC-1.0M LiPF$_6$ with 10 mM 2,7-diacetyl thianthrene, and the scan rate was 100 mV/s.

In order to shift the redox potential to more positive values, it is necessary to modify the thianthrene structure by replacing hydrogen atoms on the aromatic rings with electron withdrawing groups. For this reason, thianthrene was derivatized by replacing hydrogen atoms in the 2,7 positions with acetyl groups, according to a previously published procedure (S. Prema and M. Srinivasan, Eur. Polym. J., 23, 897 (1987)). When this compound was tested under the same conditions as thianthrene, the redox potential was found to have shifted to 4.3V for oxidation and 4.2V for the subsequent reduction (FIG. 5). The redox potential ranges for the thianthrene and the acetylized derivative compounds are given in Table 1.

TABLE 1

Redox Potential Ranges of Chemical Shuttle Reagents.

| Compound | Redox Potential Range (V vs. Li$^+$/Li) |
|---|---|
| Thianthrene | 4.06–4.12 |
| 2,7-diacetyl Thianthrene | 4.19–4.30 |

Table 2 shows the current function ($i^a_p/v^{1/2}$, where $i^a$ is the peak current for the anodic peak and v is the scan rate) obtained for the oxidative and reductive peaks seen in the cyclic voltammogram for 2,7-diacetyl thianthrene, along with the voltages for the anodic and cathodic peaks ($^aE_p$ and $^cE_p$, respectively), the peak width ($\Delta^a E_{p/2}$), and the peak separation ($\Delta^a E_p$).

The peak width and the peak separation for a one-electron reaction can be predicted from the Nernst equation according to equations [3] and [4] below:

Peak Width=$\Delta^a E_{p/2}=^a E_p - ^a E_{p/2}=2.20RT/nF=0.0565/n$ 25° C.   [3]

Peak Separation=$\Delta^a E_p=^a E_p - ^c E_p=2.22RT/nF=0.058/n$ 25° C.   [4]

TABLE 2

Electrochemical Data for Cyclic Voltammetry of 2,7-Diacetyl Thianthrene at Different Sweep Rates.

| Sweep Rate v (V/s) | Current Function $i^a_p/v^{1/2}$ A/(V/s)$^{1/2}$ | Anodic Peak Voltage $^aE_p$ (V) | Cathodic Peak Voltage $^cE_p$ (V) | Peak Width $\Delta^a E_{p/2}$ (V) | Peak Separation $\Delta E_p$ (V) |
|---|---|---|---|---|---|
| 0.001 | 1.897 × 10$^{-4}$ | 4.255 | 4.205 | 0.055 | 0.050 |
| 0.005 | 1.824 × 10$^{-4}$ | 4.258 | 4.200 | 0.053 | 0.058 |
| 0.010 | 1.820 × 10$^{-4}$ | 4.260 | 4.200 | 0.055 | 0.060 |
| 0.020 | 1.789 × 10$^{-4}$ | 4.260 | 4.200 | 0.055 | 0.060 |
| 0.050 | 1.766 × 10$^{-4}$ | 4.260 | 4.200 | 0.055 | 0.060 |

The data in Table 2 were obtained from the cyclic voltammetry of 2,7-diacetyl thianthrene at sweep rates of 1 mV/s to 50 mV/s, and they show close agreement between the experimental and theoretical values for peak width and peak separation. This indicates that the redox of 2,7-diacetyl thianthrene is a reversible reaction involving a one-electron transfer. The constancy of the current function indicates that the redox reactions are diffusion controlled.

Figure 6A:
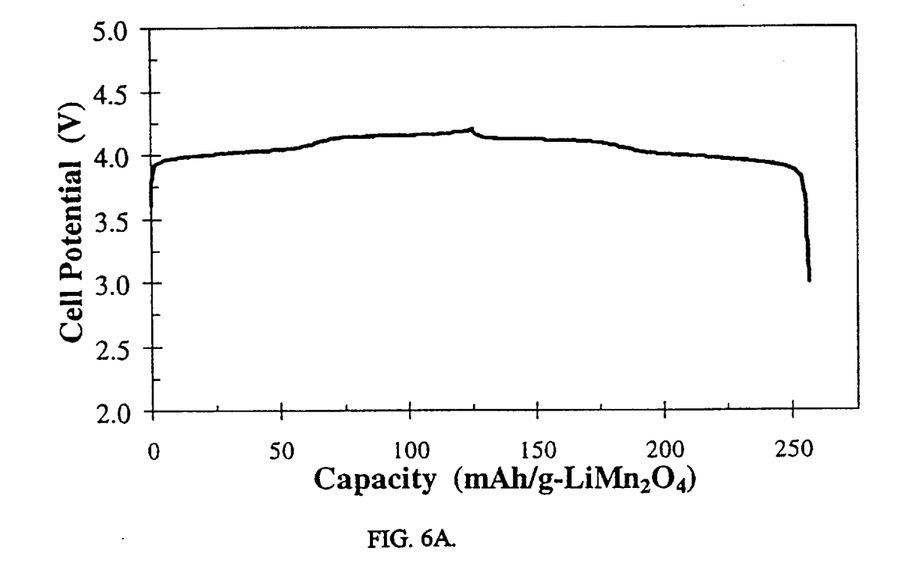
FIGS. 6A and 6B show the voltage profile for charge/discharge of a Li//Solid Polymer Electrolyte//LiMn$_2$O$_4$ cell at the first (a) and second (b) cycles. The charge limit was 4.2V for the first cycle. The charge limit was raised to 4.3V for the second cycle but did not yield significantly more capacity.
Figure 6B:
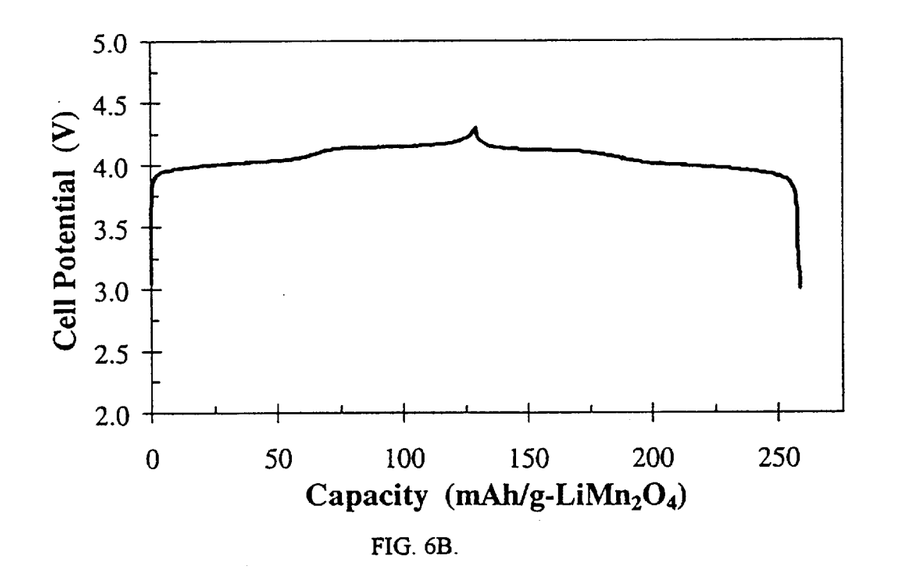

When Li/LiMn$_2$O$_4$ cells are cycled under constant current conditions, voltage profiles such as those shown in FIGS. 6A and 6B are obtained. In this instance, the upper charge limit was 4.2V for the first cycle and 4.3V for the second cycle. The peaks observed in the cyclic voltammogram (FIG. 4) correspond to the plateaus in FIGS. 6A and 6B. Increasing the upper limit from 4.2V to 4.3V vs. Li$^+$/ Li does not increase the available capacity significantly, nor does it jeopardize the integrity of the electrolyte. Tests with similar cells for which the upper charge limit was increased progressively to 5V vs. Li$^+$/Li showed the electrolyte to be stable toward oxidation over this potential range.

Proper matching of the overcharge protection additive (shuttle) to the electrochemical couple requires sufficient separation between the completion of lithium extraction from the cathode reaction and the onset of the shuttle activation. For this reason, an ideal match for the LiMn$_2$O$_4$ cathode would probably involve a shuttle activated at potentials between 4.2 and 4.5V. This would ensure complete cathode utilization, yet be well within the voltage stability window of the electrolyte.

In preferred embodiments, the redox shuttle is thianthrene (FIG. 1) or a derivative of thianthrene such as 2,7-diacetyl thianthrene (FIG. 2), and the rechargeable cell is carbon/spinel LiMn$_2$O$_4$ containing a nonaqueous liquid electrolyte such as ethylene carbonate/propylene carbonate-lithium salt, or a nonaqueous polymer electrolyte as described in U.S. Pat. Nos. 4,857,423; 5,219,413; 5,252,413; and 5,474,860. The anode may be either disordered carbon or graphite. The disordered carbon may be one obtained from the pyrolysis of petroleum coke, and known to those skilled in the field as 'petroleum coke' or 'coke'. The graphite may have the usual flake morphology, but may also be formed as graphite fibers or microtubules. The primary purpose of the acetyl functional groups of diacetyl thianthrene is to shift the redox potential to a more positive value. In a secondary role, functional groups may be added to promote solubility of the derivatized compound in the electrolyte. Other functional groups can be attached to thianthrene to either increase or decrease its redox potential. Electron withdrawing substituents such as acetyl, nitro and chloro groups are expected to increase the oxidation potential while electron releasing substituents such as alkyl groups will decrease this potential.

We have discovered that thianthrene and its derivatives such as 2,7-diacetyl thianthrene are useful as overcharge protection additives for lithium or lithium-ion cells. The choice of a particular redox reagent will vary with the cathode material used in a rechargeable Li or lithium-ion cell. Thus, although the carbon/spinel LiMn$_2$O$_4$ couple is mentioned specifically, other cathodes such as LiCoO$_2$ or LiNiO$_2$ might also be used.

Other features, objects and advantages will become apparent from the following specification when read in connection with the accompanying drawings which show the principle involved and the practical considerations in matching the cathode with the appropriate redox material. Cyclic voltammetry was used to screen candidates for use as redox shuttle reagents for overcharge protection in rechargeable Li or lithium-ion cells. Results of such experiments are given in Table 1.

The requirement of the selection of a compound for use as a redox shuttle reagent for a given positive electrode is that the oxidation potential of the shuttle reagent be slightly higher than the full charge limit of the cell. In Li or lithium-ion cells with high voltage cathodes such as spinel LiMn$_2$O$_4$, LiCoO$_2$ or LiNiO$_2$, oxidation of the redox reagent should take place after the full capacity of the cathode has been accessed. For LiMn$_2$O$_4$ this means that the shuttle should be activated at a potential above 4.2V vs. Li$^+$/Li.

Substitution of acetyl groups for hydrogen atoms at the 2,7 positions in thianthrene resulted in a shift of the redox potential to values more positive than those obtained with thianthrene. The preferred electrolytes are resistive to oxidation in this range. In particular, liquid electrolytes with ethylene carbonate (EC), propylene carbonate (PC), dipropyl carbonate (DPC), methyl ethyl carbonate (MEC) and similar solvents or mixtures of solvents are known to those skilled in the art as desirable electrolytes for use with high voltage cathodes. Likewise, these solvents or mixtures of solvents and the solvates which they form with lithium salts such as LiAsF$_6$, LiPF$_6$, LiClO$_4$, LiN(SO$_2$CF$_3$)$_2$, LiC(SO$_2$CF$_3$)$_3$, LiBF$_4$, and lithium salts of organic acids such as trichloroacetic, trifluoromethane sulfonic, and formic acids can be immobilized according to the teachings of the patents by Abraham et al. cited above.

While the specific goal of this invention is the prevention of overcharge for cells incorporating high voltage cathodes, the stability of the compound (thianthrene derivative) and the other electrolyte components at lower voltages allows its use with lower voltage cathodes also. Recent developments in the area of lithium-ion cells have included work with two-phase mixtures, notably Li$_{1+x}$Mn$_2$O$_4$ which includes both spinel (4V) LiMN$_2$O$_4$ and tetragonal (3V) Li$_2$Mn$_2$O$_4$. During the initial activation of the cell, the 3V cathode capacity is available to compensate for irreversible anode capacity. This low-voltage capacity is sacrificial, and is exhausted at the first charge. Accordingly, to demonstrate the appropriateness of our invention with this most recent cathode development, the example shows the usefulness of 2,7-diacetyl thianthrene in the presence of Li$_{1.5}$Mn$_2$O$_4$, which is a mixture of 0.5 mole of LiMn$_2$O$_4$ and 0.5 mole of Li$_2$Mn$_2$O$_4$.

The cell used to demonstrate the invention contained a Li$_{1.5}$Mn$_2$O$_4$ cathode, a solid polymer electrolyte, and a carbon counter electrode. The cathode composition was 93.5% Li$_{1.5}$Mn$_2$O$_4$:4% carbon black:2.5% PAN containing the liquid electrolyte 50% EC:50% PC-1.0M LiPF$_6$, with 10 mM 2,7-diacetyl thianthrene. The carbon electrode comprised 97.5% petroleum coke:2.55 PAN and the same liquid electrolyte. The solid polymer electrolyte film used as a separator between the two electrodes had the composition 13.87% PAN:38.63% EC:38.63% PC:7.93% LiPF$_6$:0.93% 2,7-diacetyl thianthrene. Here % stands for percent by weight.

EXAMPLE 1

2,7-diacetyl thianthrene (DAcTH) was made by the method cited earlier, and used to prepare a solid polymer electrolyte with the composition 13.87% PAN:38.63% EC:38.63% PC:0.93% DAcTH:7.93% LiPF$_6$. This electrolyte was passed between rollers to form a thin (5 mil) film and used as a separator between the anode and cathode in a carbon/LiMn$_2$O$_4$ cell. The electrodes in this cell were prepared by solvent casting from N-methylpyrollidinone. The cathode electrode was 93.5% LiMn$_2$O$_4$:4% carbon black:2.5% PAN, while the anode electrode was 97.5% petroleum coke:2.5% PAN. The current collector was aluminum foil for the cathode and copper foil for the anode. Both electrodes were dried under vacuum at room temperature for 2 hours, then hot-pressed at 130° C. and 5,000 psig for 2 min. The electrodes were trimmed to size, and a liquid electrolyte comprising 50% EC:50% PC-1.0M LiPF$_6$, 10 mM 2,7-diacetyl thianthrene was added to each electrode, with the excess allowed to drain away. The cell was assembled in a metallized plastic bag which was heat-sealed at its periphery to prevent air and moisture ingression.

Figure 7:
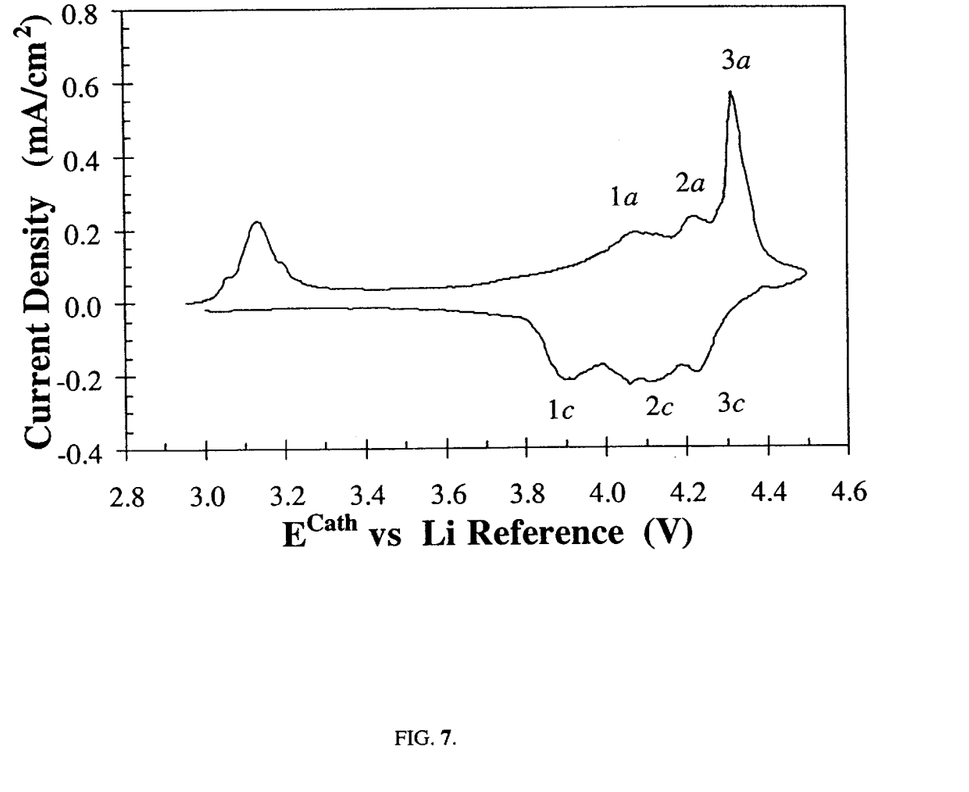
FIG. 7 is a cyclic voltammogram for a carbon//polymer electrolyte//LiMn$_2$O$_4$ cell containing 2,7-diacetyl thianthrene in the electrolyte and cycled at 20 μV/s.

This cell was tested under cyclic voltammetric conditions as per the cell described in FIG. 4 (20 μV/s, 4.5V upper limit). FIG. 7 shows clearly the presence of the two peaks expected for the lithium extraction from $LiMn_2O_4$ at 4.05 (1a, and its inverse peak 1c; where a represents the anodic peak and c represents the cathodic peak) and 4.17V (2a, 2c) and an additional reversible peak at 4.4V (3a, 3c). These last peaks corresponds the oxidation and reduction of acetyl thianthrene.

We claim:

1. An electric current producing, rechargeable, electrochemical cell having an anode, a cathode and an electrolyte in contact with said anode and cathode, said electrolyte containing thianthrene or a derivative of thianthrene as a redox shuttle reagent to provide overcharge protection to the cell.

2. A rechargeable cell of claim 1 wherein said anode comprises Li and said cathode comprises a compound selected from $LiMn_2O_4$, $LiCoO_2$, $LiNiO_2$, $LiV_2O_5$, $LiVS_2$, $LiCr_{0.5}V_{0.5}S_2$, and mixtures thereof.

3. A rechargeable cell of claim 1 wherein said anode comprises a Li insertion anode selected from carbon, metal, alloys, metal oxides, metal sulfides and metal nitrides, and said cathode comprises a compound selected from $LiMn_2O_4$, $LiCoO_2$, $LiNiO_2$, $LiV_2O_5$, $LiCr_{0.5}S_2VS_2$ or mixtures thereof.

4. A rechargeable cell of claim 2 wherein said electrolyte comprises Li salt dissolved in an organic solvent or a solvent mixture selected from ethers, carbonates, esters, sulfones, ketones and lactones.

5. A rechargeable cell of claim 3 wherein said electrolyte comprises Li salt dissolved in an organic solvent or a solvent mixture selected from ethers, carbonates, esters, sulfones, ketones and lactones.

6. A rechargeable cell of claim 2 wherein said electrolyte comprises a polymer electrolyte composed of a Li salt, a polymer host and a plasticizer solvent.

7. A rechargeable cell of claim 3 wherein said electrolyte comprises a polymer electrolyte composed of a Li salt, a polymer host and plasticizer solvent.

8. A rechargeable cell of claim 6 wherein said Li salt is selected from $LiPF_6$, $LiAsF_6$, $LiClO_4$, $LiBF_4$, $LiN(SO_2CF_3)_2$, $LiC(SO_2CF_3)_3$, and mixtures thereof; said polymer host is selected from polyacrylonitrile, poly(vinyl chloride), poly(vinyl pyrrolidinone), poly(vinyl sulfone), poly(vinylidine fluoride) or its copolymers, and poly (ethylene oxide) and said plasticizer solvent includes an organic solvent selected from ethylene carbonate, dipropyl carbonate, dimethyl carbonate, diethyl carbonate, butyrolactone, N-methyl pyrrolidinone, sulfolane and mixtures thereof.

9. A rechargeable cell of claim 7 wherein said Li salt is selected from $LiPF_6$, $LiAsF_6$, $LiClO_4$, $LiBF_4$, $LiN(SO_2CF_3)_2$, $LiC(SO_2CF_3)_3$, and mixtures thereof; said polymer host is selected from polyacrylonitrile, poly(vinyl chloride), poly(vinyl pyrrolidinone), poly(vinyl sulfone), poly(vinylidine fluoride) or its copolymers, and poly (ethylene oxide), and said plasticizer solvent consists of an organic solvent selected from ethylene carbonate, dipropyl carbonate, dimethyl carbonate, diethyl carbonate, butyrolactone, N-methyl pyrrolidinone, sulfolane and mixtures thereof.

10. A rechargeable cell of claim 4 wherein the thianthrene derivative is 2,7-diacetyl thianthrene.

11. A rechargeable cell of claim 5 wherein the thianthrene derivative is 2,7-diacetyl thianthrene.

12. A rechargeable cell of claim 8 wherein the thianthrene derivative is 2,7-diacetyl thianthrene.

13. A rechargeable cell of claim 9 wherein the thianthrene derivative is 2,7-diacetyl thianthrene.

14. A rechargeable cell according to claim 1 wherein said electrolyte comprises a Li salt dissolved in an organic solvent or a solvent mixture selected from ethers, carbonates, esters, sulfones, ketones and lactones.

15. A rechargeable cell according to claim 1 wherein said electrolyte comprises a polymer electrolyte composed of a Li salt, a polymer host and a plasticizer solvent.

16. A rechargeable cell according to claim 1 wherein the thianthrene derivative comprises 2,7-diacetyl thianthrene.

17. A rechargeable cell according to claim 1 wherein said cathode comprises an oxide or sulfide containing compound.

18. A method for providing a rechargeable, electrochemical cell, comprising the steps of providing an anode and a cathode, providing an electrolyte in contact with said anode and said cathode; and dissolving within said electrolyte a thianthrene based compound for acting as a redox shuttle reagent to provide overcharge protection to the cell.

19. A method for providing a rechargeable, electrochemical cell according to claim 18 wherein the step of providing an electrolyte includes the step of providing a Li salt dissolved in an organic solvent or a solvent mixture selected from ethers, carbonates esters, sulfones, ketones and lactones.

20. A method for providing a rechargeable, electrochemical cell according to claim 18 wherein the step of providing an electrolyte includes the step of providing a polymer electrolyte comprised of a Li salt, a polymer host and a plasticizer solvent.

21. A method for providing a rechargeable, electrochemical cell according to claim 18 wherein the step of providing a thianthrene containing compound includes the step of providing 2,7-diacetyl thianthrene.

* * * * *